US011838130B2

(12) United States Patent
Olsson et al.

(10) Patent No.: US 11,838,130 B2
(45) Date of Patent: *Dec. 5, 2023

(54) METHOD FOR PARTIAL RETRANSMISSION

(71) Applicant: Telefonaktiebolaget LM Ericsson (publ), Stockholm (SE)

(72) Inventors: Jonas Fröberg Olsson, Ljungsbro (SE); Simon Sörman, Jönköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,909

(22) Filed: Mar. 14, 2022

(65) Prior Publication Data

US 2022/0200739 A1 Jun. 23, 2022

Related U.S. Application Data

(63) Continuation of application No. 16/789,767, filed on Feb. 13, 2020, now Pat. No. 11,283,554, which is a
(Continued)

(51) Int. Cl.
*H04L 1/1812* (2023.01)
*H04L 1/1867* (2023.01)
(Continued)

(52) U.S. Cl.
CPC .......... *H04L 1/1819* (2013.01); *H04L 1/1671* (2013.01); *H04L 1/1854* (2013.01);
(Continued)

(58) Field of Classification Search
CPC ... H04L 1/1819; H04L 1/1854; H04L 1/1861; H04L 1/1896; H04L 5/0055
See application file for complete search history.

(56) References Cited

U.S. PATENT DOCUMENTS 10,686,563 B2 * 6/2020 Fröberg ................ H04L 1/1854
11,283,554 B2 * 3/2022 Fröberg ................ H04L 1/1671
(Continued)

FOREIGN PATENT DOCUMENTS

CN 101414901 A 4/2009
CN 101911571 A 12/2010
(Continued)

OTHER PUBLICATIONS

LG Electronics, "R1-166898: Discussion on outer coding on eMBB data," 3GPP TSG RAN WG1 Meeting #86, Aug. 22-26, 2016, Gothenburg, Sweden, 5 pages.
(Continued)

*Primary Examiner* — Kashif Siddiqui
(74) *Attorney, Agent, or Firm* — Withrow & Terranova, PLLC

(57) ABSTRACT

Methods and systems for partial retransmission are provided. According to one aspect, a method for receiving, at a receiver, a partial retransmission from a sender, comprises: receiving a control information message indicating a second transmission to be received, the second transmission comprising retransmitted data, the retransmitted data comprising a retransmission of a portion of a first transmission; receiving the second transmission; determining, based on a mapping indicator, a location of the retransmitted data within the second transmission; and decoding the retransmitted data at the determined location within the second transmission. The mapping indicator may be received as part of the control information message or may be received separately from the control information message. In one embodiment, the combination of the control information and the mapping indicator indicates what portions of the first transmission are being retransmitted and where they are located within the second transmission.

35 Claims, 7 Drawing Sheets

Related U.S. Application Data continuation of application No. 15/747,912, filed as application No. PCT/SE2017/051307 on Dec. 20, 2017, now Pat. No. 10,686,563.

(60) Provisional application No. 62/455,279, filed on Feb. 6, 2017.

(51) Int. Cl.
  *H04L 1/1607* (2023.01)
  *H04L 1/1829* (2023.01)
  *H04L 5/00* (2006.01)

(52) U.S. Cl.
  CPC .......... *H04L 1/1861* (2013.01); *H04L 1/1896* (2013.01); *H04L 5/0055* (2013.01)

(56) References Cited

U.S. PATENT DOCUMENTS

| | | | |
|---|---|---|---|
| 2002/0159384 A1 | 10/2002 | Classon et al. | |
| 2004/0013105 A1* | 1/2004 | Ahmavaara | H04L 1/1845 370/349 |
| 2006/0184854 A1* | 8/2006 | Ihm | H04L 1/1614 714/749 |
| 2006/0193391 A1 | 8/2006 | Borran et al. | |
| 2010/0202386 A1 | 8/2010 | Takaoka et al. | |
| 2010/0220799 A1 | 9/2010 | Zheng et al. | |
| 2011/0041027 A1* | 2/2011 | Fong | H04W 72/23 370/330 |
| 2012/0005550 A1 | 1/2012 | Ito | |
| 2012/0063382 A1 | 3/2012 | Seki | |
| 2012/0147832 A1* | 6/2012 | Kim | H04L 1/1864 370/329 |
| 2016/0226643 A1* | 8/2016 | Mallik | H04L 1/1819 |
| 2018/0054800 A1* | 2/2018 | Yeo | H04W 76/15 |
| 2018/0309546 A1* | 10/2018 | Tang | H04L 1/1861 |
| 2019/0020444 A1 | 1/2019 | Fröberg Olsson et al. | |

FOREIGN PATENT DOCUMENTS

| | | |
|---|---|---|
| CN | 102037671 A | 4/2011 |
| CN | 102362459 A | 2/2012 |
| CN | 101741525 B | 11/2012 |
| CN | 104115436 A | 10/2014 |
| CN | 106160954 A | 11/2016 |
| EP | 3386136 A1 | 10/2018 |
| WO | 2008132599 A2 | 11/2008 |
| WO | 2016126330 A1 | 8/2016 |

OTHER PUBLICATIONS

Zte et al., "R1-1608976: Consideration on Outer Codes for NR," 3GPP TSG RAN WG1 #86bis, Oct. 10-14, 2016, Lisbon, Portugal, 9 pages.
Non-Final Office Action for U.S. Appl. No. 15/747,912, dated Jan. 29, 2019, 12 pages.
Final Office Action for U.S. Appl. No. 15/747,912, dated Mar. 25, 2019, 12 pages.
Advisory Action and AFCP 2.0 Decision for U.S. Appl. No. 15/747,912, dated May 17, 2019, 5 pages.
Non-Final Office Action for U.S. Appl. No. 15/747,912, dated Aug. 9, 2019, 14 pages.
Notice of Allowance for U.S. Appl. No. 15/747,912, dated Nov. 26, 2019, 7 pages.
First Office Action for Chinese Patent Application No. 201780085207.5, dated Mar. 31, 2020, 25 pages.
Examination Report for European Patent Application No. 17823244.3, dated Mar. 1, 2019, 4 pages.
Extended European Search Report for European Patent Application No. 19196403.0, dated Feb. 12, 2020, 4 pages.
Office Action for Israeli Patent Application No. 268018, dated Nov. 21, 2019, 9 pages.
Office Action for Japanese Patent Application No. 2019-539883, dated Jan. 10, 2020, 5 pages.
Notification of Reason for Refusal for Korean Patent Application No. 10-2019-7023489, dated Sep. 11, 2019, 4 pages.
Decision to Grant for Korean Patent Application No. 10-2019-7023489, dated Dec. 30, 2019, 3 pages.
International Search Report and Written Opinion for International Patent Application No. PCT/SE2017/051307, dated Apr. 5, 2018, 12 pages.
International Preliminary Report on Patentability for International Patent Application No. PCT/SE2017/051307, dated Jan. 8, 2019, 19 pages.
Applicant-Initiated Interview Summary for U.S. Appl. No. 15/747,912, dated Apr. 12, 2019, 3 pages.
Corrected Notice of Allowability for U.S. Appl. No. 15/747,912, dated May 18, 2020, 4 pages.
Non-Final Office Action for U.S. Appl. No. 16/789,767, dated Jun. 25, 2021, 17 pages.
Notice of Allowance for U.S. Appl. No. 16/789,767, dated Nov. 19, 2021, 7 pages.
Second Office Action for Chinese Patent Application No. 201780085207.5, dated Sep. 30, 2020, 20 pages.
Third Office Action for Chinese Patent Application No. 201780085207.5, dated Jan. 18, 2021, 8 pages.
Extended European Search Report for European Patent Application No. 21174021.2, dated Nov. 16, 2021, 7 pages.
Notice of Reasons for Refusal for Japanese Patent Application No. 2019-539883, dated Jun. 22, 2020, 6 pages.
First Office Action for Chinese Patent Application No. 2021108289221, dated Sep. 22, 2023, 6 pages.

* cited by examiner

METHOD FOR PARTIAL RETRANSMISSION

RELATED APPLICATIONS

This application is a continuation of U.S. patent application Ser. No. 16/789,767, filed Feb. 13, 2020 now U.S. Pat. No. 11,283,554, which is a continuation of U.S. patent application Ser. No. 15/747,912, filed Jan. 26, 2018, now U.S. Pat. No. 10,686,563, which is a 35 U.S.C. § 371 national phase filing of International Application No. PCT/SE2017/051307, filed Dec. 20, 2017, which claims the benefit of provisional patent application Ser. No. 62/455,279, filed Feb. 6, 2017, the disclosures of which are hereby incorporated herein by reference in their entireties.

TECHNICAL FIELD

The present disclosure relates to Hybrid Automatic Repeat Request (HARQ), Mobile Broadband (MBB), and Ultra-Reliable Low Latency Communication (URLLC) scheduling.

BACKGROUND

A Transport Block (TB) is data from an upper layer, e.g., from the Media Access Controller (MAC), that is given to the physical layer for transmission in a Transmission Time Interval (TTI). A TB may range in size from 16 bits to 36696 bits for a 10 Megahertz (MHz) Long Term Evolution (LTE) system. A TB may be split into Code Blocks (CBs), which have a maximum size of 6144 bits, meaning that the largest TB will have 7 code blocks. A TB Cyclic Redundancy Check (CRC) value is attached to the transport block. If a TB is divided into CBs, a CB CRC is attached to each CB.

In many wireless communications systems Hybrid Automatic Repeat Request (HARQ) retransmission is a method to mitigate unpredictable interference and channel variations. For downlink, when a wireless device attempts to decode a data message, the wireless device sends to the transmitter an indicator that indicates whether the decoding was successful or not. When the transmitter receives an indicator indicating unsuccessful decoding, the transmitter typically performs a retransmission of the data message, which the receiver typically will combine with the original received transmission. The combining is known as soft combining. Two well-known techniques for soft combining are "Chase combining," in which every retransmission contains the same information, and "incremental redundancy," in which every retransmission contains different information from the previous transmission, e.g., the retransmission contains only those portions of the original transmission that were not received correctly. The combining will greatly increase the probability of successful decoding.

In LTE the indicator indicating the result of a decoding attempt is known as a HARQ Acknowledgement (HARQ-ACK). For LTE up to two transport blocks (two data messages) may be transmitted in each Transmission Time Interval (TTI), which means that the HARQ-ACK may consist of 2 bits, where each bit indicates successful or unsuccessful receipt of the respective transport block.

LTE is a standard in the Third Generation Partnership Project (3GPP) family of wireless systems and is highly optimized for Mobile Broadband (MBB) traffic. The TTI in LTE is a subframe of 1 ms duration and the HARQ-ACK is, for Frequency Division Duplex (FDD), transmitted in subframe n+4 for a data transmission in subframe n. Ultra-Reliable Low Latency Communication (URLLC) is data service with extremely strict error and latency requirements. Error probabilities as low as $10^{-5}$ or lower and 1 ms end-to-end latency or lower are expected requirements.

Fifth Generation (5G) is currently being studied by 3GPP and is targeting a wide range of data services including MBB and URLLC. To enable optimized service, the length of TTI is expected to be different for different services, where URLLC may have a shorter TTI length compared to MBB.

It may then happen that, while a transmitter is in the middle of a MBB transmission, that transmitter may receive a URLLC data packet that is also to be transmitted. In this scenario, it may therefore be desirable for the transmitter to blank, i.e. interrupt, the MBB transmission in certain time-frequency resources and instead perform a URLLC transmission on those resources so that the URLLC transmission meets its latency and reliability requirements. This has the drawback that the wireless device receiving the partial or punctured MBB will likely fail the decoding, a situation which is handled by the HARQ feedback mechanism of retransmitting transport blocks that were not successfully received and decoded.

SUMMARY

Problems with Existing Solutions

The problem with resolving the punctured Mobile Broadband (MBB) transmission with a retransmission is that even though the puncturing of the initial transmission (e.g., by an Ultra-Reliable Low Latency Communication (URLLC) transmission) affects only part of the data transmitted, the entire transport block must be retransmitted. That is, a relatively small puncturing transmission can cause the retransmission of a much larger MBB transmission, even though most of the MBB transmission was not punctured and received correctly. Furthermore, because the existing Hybrid Automatic Repeat Request (HARQ) feedback mechanism triggers retransmission of an entire transport block in the event of failure, and because a URLLC data packet may interrupt a longer MBB transmission at any time, this gives rise to the possibility that a relatively long MBB transmission is interrupted by a relatively short URLLC transmission, which causes the MBB transmission to fail. While the User Equipment (UE) is retransmitting the long MBB transmission, that transmission is again interrupted by a short URLLC transmission, which causes the entire MBB transmission to be retransmitted a second time, which may yet again be interrupted by yet another URLLC transmission, and so on. In other words, shorter URLLC transmissions can dramatically hinder successful transmission of longer MBB transmission. Such retransmission, and especially multiple retransmissions, is wasteful and additionally creates interference for other simultaneous data transmissions.

To address these problems, methods and systems for partial retransmission are provided herein, in which the wireless device receives an indicator indicating the mapping of coded bits (e.g., code blocks) to a location or locations in the retransmission, e.g., the mapping gives the receiver information about which subset or subsets of the coded bits will be retransmitted, and in which location of the retransmission each subset is located. The receiver can then receive the retransmission only in the indicated locations, and can attempt decoding the data packet together with soft information, if any, from the first transmission.

According to one aspect of the present disclosure, a method for receiving, at a receiver, a partial retransmission from a sender, comprises receiving a control information message indicating a second transmission to be received in a Transmission Time Interval (TTI) comprising a plurality of symbols, the second transmission comprising retransmitted data in a subset of the plurality of symbols of the TTI, the retransmitted data comprising a retransmission of a portion of a first transmission; receiving the second transmission; determining, based on a mapping indicator indicating the subset of the plurality of symbols of the TTI, a location of the retransmitted data within the second transmission; and decoding the retransmitted data at the determined location within the second transmission.

In some embodiments, the control information message comprises a Downlink Control Information (DCI) message.

In some embodiments, the control information message identifies what portion of the first transmission is being retransmitted.

In some embodiments, the mapping indicator is included in the received control information message.

In some embodiments, the mapping indicator is received separately from the control information message.

In some embodiments, the mapping indicator indicates that the retransmitted data will occupy the same location or locations in the second transmission as the originally transmitted data occupied in the first transmission.

In some embodiments, the mapping indicator indicates that the retransmitted data will occupy contiguous locations within the second transmission.

In some embodiments, the mapping indicator indicates that the retransmitted data will be distributed throughout the second transmission.

In some embodiments, the mapping indicator identifies what portion of the first transmission is being retransmitted.

In some embodiments, the mapping indicator identifies one mapping from among a plurality of mappings, each mapping identifying at least one of: a location of the retransmitted data within the second transmission; and what portion of the first transmission is being retransmitted.

In some embodiments, the control information message or the mapping indicator includes a combination instruction that indicates whether the retransmitted data will replace the originally transmitted data or will be soft combined with the originally transmitted data.

In some embodiments, the combination instruction comprises a redundancy version.

In some embodiments, the receiver comprises a wireless device or user equipment.

In some embodiments, the transmission comprises a transport block and the portion of the transmission comprises a code block or a code block group.

In some embodiments, the receiver indicates unsuccessful reception of a portion or portions of a transmission via transmitting a HARQ feedback.

In some embodiments, the HARQ feedback comprises multiple bits per transport block.

In some embodiments, the multiple bits are used to signal a HARQ Acknowledgement (ACK) or Negative ACK (NACK) per transport block or per code block.

According to another aspect of the present disclosure, a wireless device for receiving partial retransmission from a sender is adapted to operate according to any of the wireless device methods described herein.

According to another aspect of the present disclosure, a wireless device for receiving partial retransmission from a sender comprises at least one transceiver and processing circuitry adapted to cause the wireless device to operate according to any of the wireless device methods described herein.

According to another aspect of the present disclosure, a wireless device for receiving partial retransmission from a sender comprises at least one module adapted to operate according to any of the wireless device methods described herein.

According to another aspect of the present disclosure, a computer program comprises instructions which, when executed on at least one processor of a wireless device, cause the at least one processor to carry out any of the wireless device methods described herein.

According to another aspect of the present disclosure, a carrier contains the computer program described above, wherein the carrier is one of an electronic signal, an optical signal, a radio signal, or a computer readable storage medium.

According to another aspect of the present disclosure, a method of performing a partial retransmission by a sender comprises sending, to a receiver, a first transmission; receiving, from the receiver, an indication identifying at least one portion of the first transmission that should be retransmitted; sending, to the receiver, a control information message indicating that a second transmission will be transmitted in a TTI comprising a plurality of symbols, the second transmission comprising retransmitted data in a subset of the plurality of symbols of the TTI, the retransmitted data comprising a retransmission of a portion of a first transmission; and sending, to the receiver, the second transmission.

In one embodiment, the method includes, prior to sending the second transmission: sending, to the receiver, a mapping indicator for indicating a location of the retransmitted data within the second transmission.

In one embodiment, the mapping indicator is sent as part of the control information message.

In one embodiment, the mapping indicator is sent separately from the control information message.

In one embodiment, the mapping indicator indicates that the retransmitted data will occupy the same location or locations in the second transmission as the originally transmitted data occupied in the first transmission.

In one embodiment, the mapping indicator indicates that the retransmitted data will occupy contiguous locations within the second transmission.

In one embodiment, the mapping indicator indicates that the retransmitted data will be distributed throughout the second transmission.

In one embodiment, the mapping indicator identifies what portion of the first transmission is being retransmitted.

In one embodiment, the mapping indicator identifies one mapping from among a plurality of mappings, each mapping identifying at least one of: a location of the retransmitted data within the second transmission; and what portion of the first transmission is being retransmitted.

In one embodiment, the control information message or the mapping indicator includes a combination instruction that indicates whether the retransmitted data will replace the originally transmitted data or will be soft combined with the originally transmitted data.

In one embodiment, the combination instruction comprises a redundancy version.

In one embodiment, the receiver comprises a wireless device or user equipment.

In one embodiment, the transmission comprises a transport block and the portion of the transmission comprises a code block or a code block group.

In one embodiment, the receiver indicates unsuccessful reception of a portion or portions of a transmission via transmitting a HARQ feedback.

In one embodiment, the HARQ feedback comprises multiple bits per transport block.

In one embodiment, the multiple bits are used to signal a HARQ ACK or NACK per transport block or per code block.

In one embodiment, the network node comprises a radio access node.

According to another aspect of the present disclosure, a network node for performing a partial retransmission, the network node adapted to operate according to any of the network node methods described herein.

According to another aspect of the present disclosure, a network node for performing a partial retransmission comprises at least one radio unit, and a control system adapted to cause the network node to operate according to any of the network node methods described herein.

According to another aspect of the present disclosure, a network node for performing a partial retransmission, the network node comprises at least one module adapted to operate according to any of the network node methods described herein.

According to another aspect of the present disclosure, a computer program carries instructions which, when executed on at least one processor of a network node, cause the at least one processor to carry out any of the network node methods described herein.

According to another aspect of the present disclosure, a carrier containing the computer program described above, wherein the carrier is one of an electronic signal, an optical signal, a radio signal, or a computer readable storage medium.

Advantages of the Proposed Solution

Multi-bit HARQ feedback allows the receiver to indicate to the transmitter that certain code blocks could be decoded correctly while others could not, prompting the transmitter to retransmit the code blocks that were not decoded correctly. In the present disclosure, the UE is allocated with resources (a TTI with a number of symbols) for receiving a retransmission. However, a partial retransmission does not require all allocated resources (all symbols of the TTI), so the unused resources (symbols of the TTI) allocated for the retransmission can, e.g., be used for an URLLC transmission with shorter TTI. Furthermore, the sending node can distribute retransmission data and URLLC data on the allocated resources (the symbols of the allocated TTI) in a flexible way depending on the need, by using a mapping indicator to tell the UE on what symbols of the TTI to receive the retransmission data. This solution gives more freedom in the retransmission of erroneously received code blocks in that the locations of the retransmitted code block can be configured to minimize the probability of having to puncture the retransmission.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
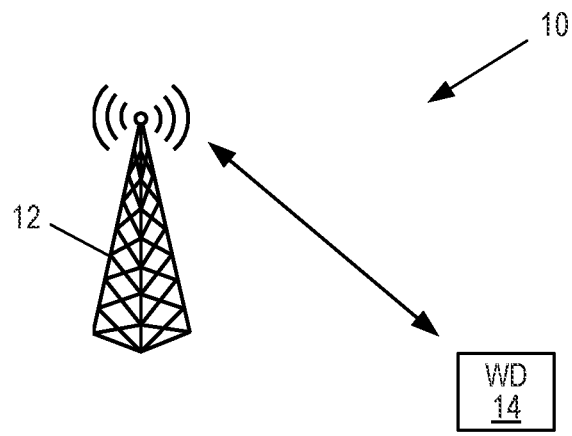
FIG. 1 illustrates one example of a wireless system (e.g., a cellular communications system) in which embodiments of the present disclosure may be implemented.

FIG. 1 illustrates one example of a wireless system 10 (e.g., a cellular communications system) in which embodiments of the present disclosure may be implemented. In the embodiment illustrated in FIG. 1, the wireless system 10 includes a radio access node 12, and a wireless device 14.

Figure 2:
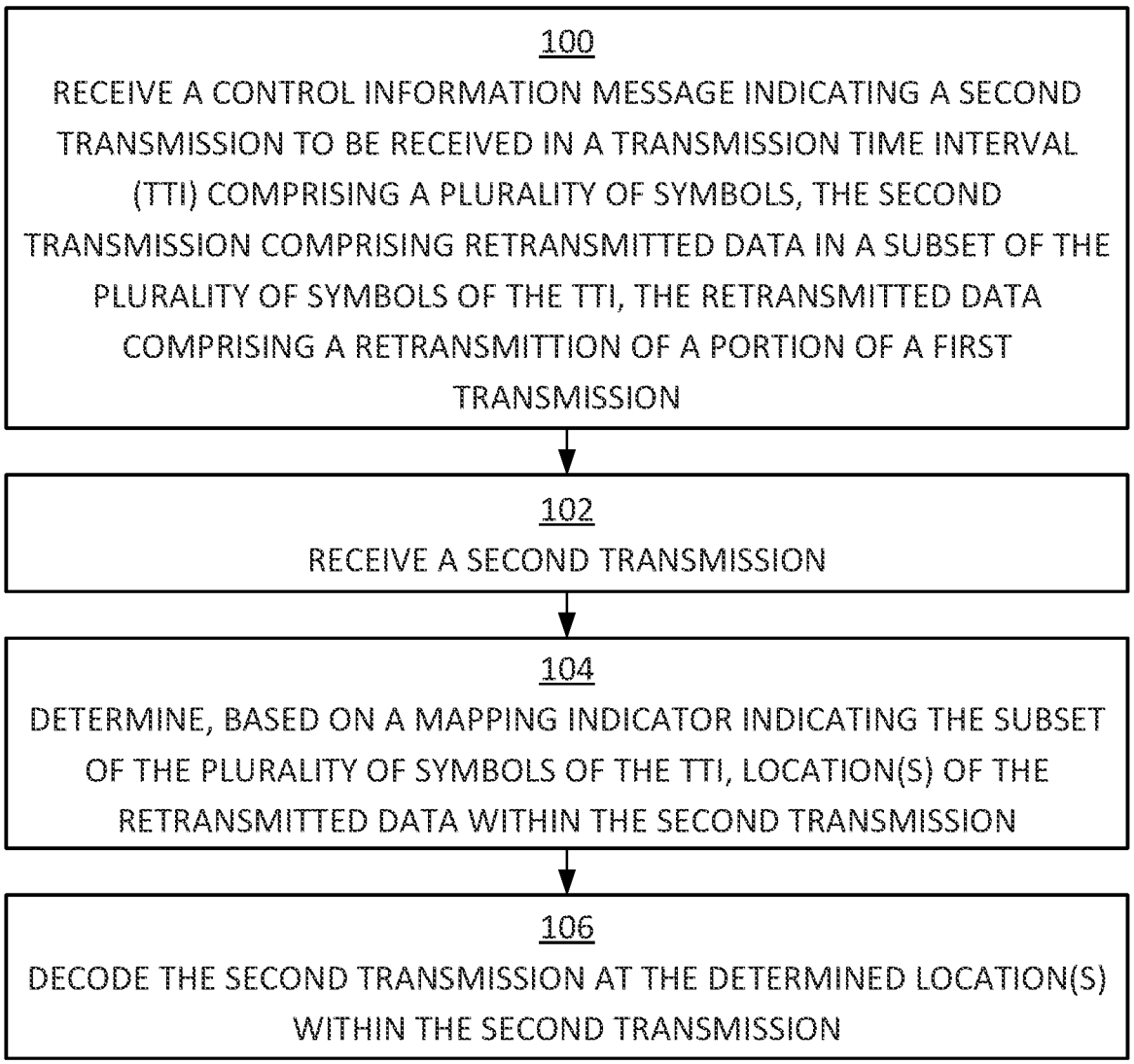
FIG. 2 is a flow chart illustrating an exemplary process for partial retransmission according to an embodiment of the present disclosure.

FIG. 2 is a flow chart illustrating an exemplary process for partial retransmission according to an embodiment of the subject matter described herein. In the embodiment illustrated in FIG. 2, the process begins after a receiver (e.g., the wireless device 14), has received a first transmission from a sender (e.g., the radio access node 12). The receiver has determined that some portion or portions of the first transmission were not received correctly, and reported this fact back to the sender of the first transmission, e.g., via a Hybrid Automatic Repeat Request (HARQ) Negative Acknowledgement (NACK). Multiple-bit HARQ feedback allows the receiver to indicate which portions or code blocks were correctly received (e.g., via a positive Acknowledgement (ACK) for those portions or code blocks) and which portions or code blocks were not correctly received (e.g., via a NACK for those portions or code blocks). In the examples detailed below, the sender is assumed to be the radio access node 12, but the present disclosure is not limited to just this. In alternative embodiments, for example, the sender may be another wireless device.

At step 100, the receiver receives a control information message indicating a second transmission to be received in a Transmission Time Interval (TTI) comprising a plurality of symbols, wherein the second transmission includes retransmitted data in a subset of the plurality of symbols of the TTI, the retransmitted data comprising a retransmission of a portion of the first transmission. In one embodiment, the control information message comprises a Downlink Control Information (DCI) message.

At step 102, the receiver receives the second transmission. The control information message may be sent separately from the second transmission or it may be part of the second transmission.

At step 104, the receiver determines, based on a mapping indicator indicating the subset of the plurality of symbols of the TTI, the location or locations of the retransmitted data within the second transmission. In one embodiment, the mapping indicator indicates the locations within the second transmission that will be occupied by the retransmitted data. In one embodiment, the mapping indicator indicates which portions of the first transmission occupy those locations within the second transmission. In one embodiment, the mapping indicator contains both information that identifies the portion(s) to be retransmitted and the location(s) in which the portion(s) will appear within the retransmission. This information—e.g., what portions of the first transmission appear in the second transmission and/or where they appear in the second retransmission—may be referred to as the "transmission format" of the second transmission. In one embodiment, the mapping indicator is a component of the DCI message. In one embodiment, the mapping indicator is provided via a mechanism other than the DCI message.

It is noted that, where the control information indicating that a second transmission is to be received comprises a DCI message, the DCI message may conceptually be considered to be part of the second transmission, e.g., the DCI message may be considered part of the "retransmission." Alternatively, the DCI message may be considered an entity separate from the retransmission, in which case the DCI message may be referred to as the "retransmission assignment."

At step 106, the receiver decodes the second transmission at the determined location(s) within the second transmission. In one embodiment, either the control signaling information or the mapping indicator may contain information that instructs the receiver whether the retransmitted data will replace the originally transmitted data or whether it will be soft combined with the corresponding portion of the first transmission. An example of such information is the Redundancy Version (RV) used in LTE.

It is noted that, in alternative embodiments, steps 102 and 104 may be fully or partially omitted. For example, in embodiments where the retransmitted portions are always located closest to the beginning of the retransmission, the receiver already knows the location of the retransmitted portions within the second transmission, in which case a mapping indicator is not needed, or, if a mapping indicator is used to identify the portion(s) being retransmitted, the mapping indicator need not also identify the locations of the retransmitted portions within the second transmission.

It is also noted that the subject matter described herein contemplates an embodiment in which the receiver is not informed which portions of the first transmission are being retransmitted—i.e., the sender presumes that, since the receiver notified the sender which portions of the first transmission were not successfully received, the receiver already knows what will be retransmitted by the sender. Such an embodiment, however, presumes that the HARQ NACK message (or whatever mechanism was used by the receiver to notify the sender of unsuccessfully received portions of the first transmission) was received by the sender without corruption. Since such corruption of the HARQ NACK message is theoretically possible, a more robust embodiment of the subject matter described herein identifies to the receiver which portions are being retransmitted; this allows the receiver to confirm that the HARQ NACK message information was correctly received by the sender.

In one embodiment, the receiver may try one or more hypotheses based on the HARQ NACK message, where one hypothesis may be that the HARQ NACK message may be corrupt. For example, the receiver may have sent two HARQ NACKs indicating incorrect reception of two parts. At reception of the retransmission, the receiver may try three hypotheses: (a) assume that both HARQ NACKs were NOT corrupted; (b) assume that the first HARQ NACK was corrupted but the second HARQ NACK was not corrupted; and (c) assume that the second HARQ NACK was corrupted but the first HARQ NACK was not corrupted.

Figure 3:
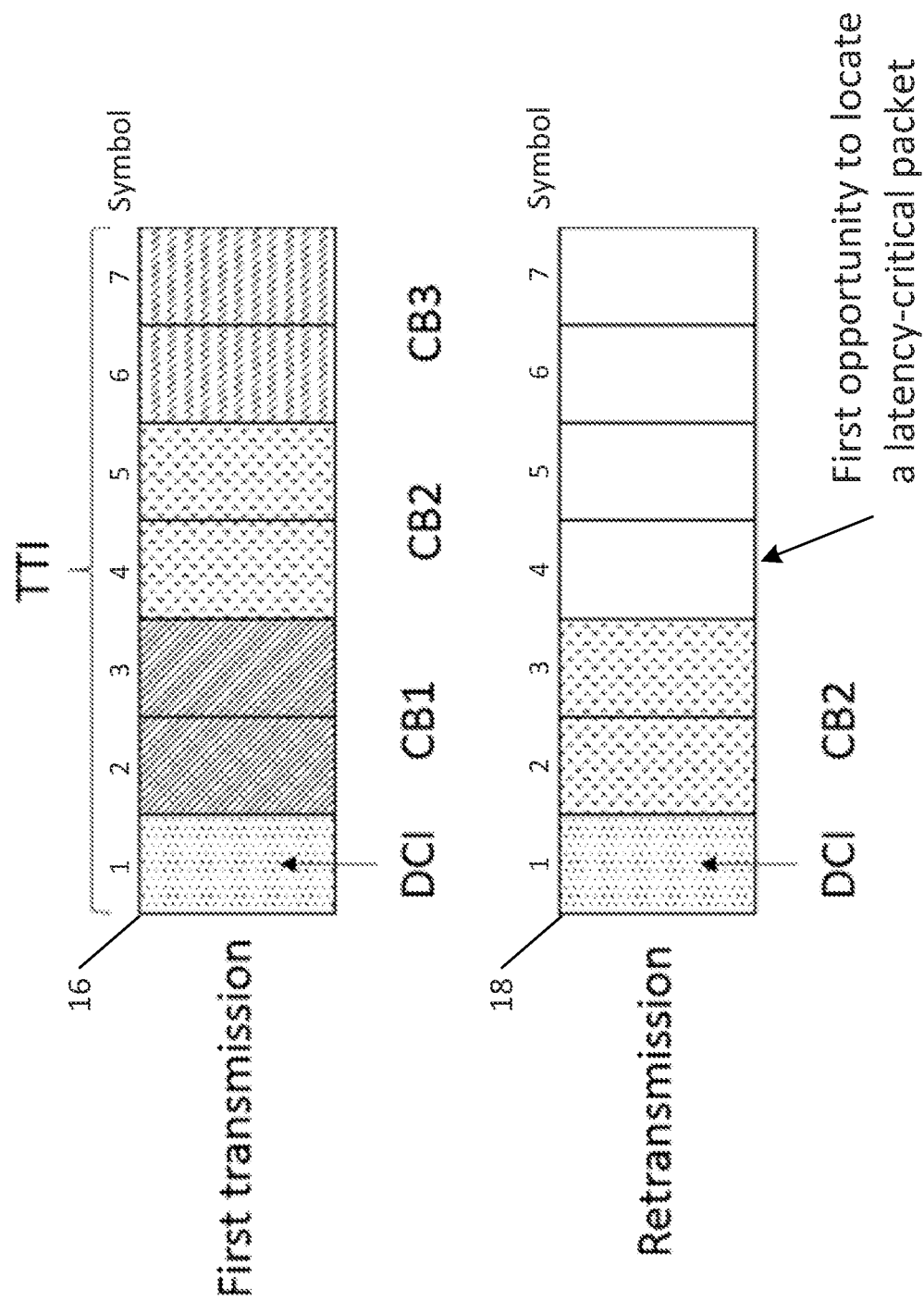
FIG. 3 illustrates an exemplary partial retransmission according to an embodiment of the present disclosure, in which a code block is retransmitted in subsequent symbols following the Downlink Control Information (DCI).
Figure 4:
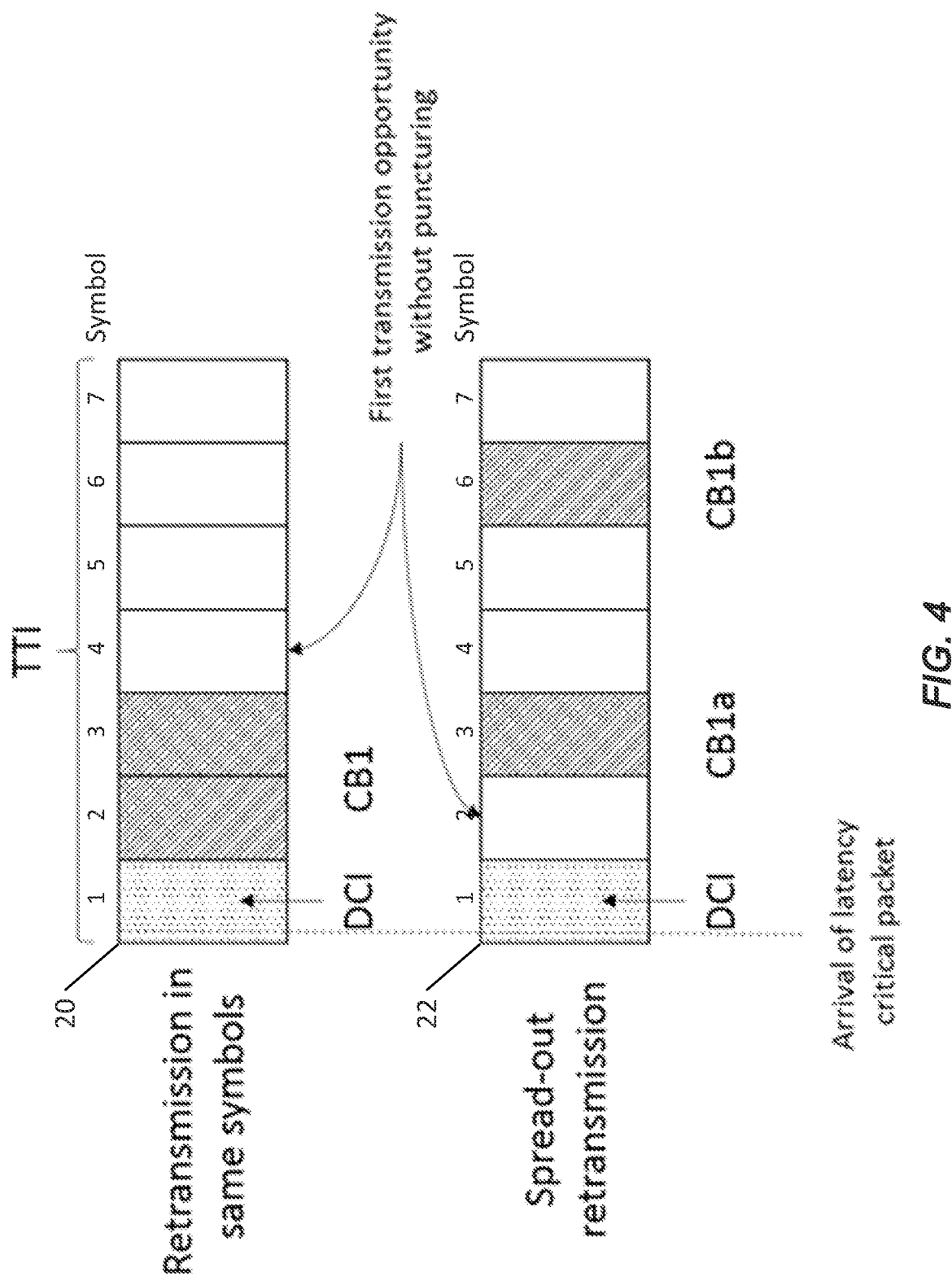
FIG. 4 illustrates an exemplary partial retransmission according to an embodiment of the present disclosure, in which a code block being retransmitted is distributed in such a way as to provide space available for use to transmit latency critical data.

FIGS. 3 and 4 graphically illustrate example retransmissions according to various embodiments of the subject matter described herein. In the embodiments illustrated in FIGS. 3 and 4, the Transmission Time Interval (TTI) of a transmission is divided into 7 symbols, where the first symbol contains a DCI and subsequent symbols are divided into pairs, each carrying one Code Block (CB), thus the Transport Block (TB) is divided into 3 code blocks.

Embodiment: DCI Indication of Retransmitted CB

FIG. 3 illustrates an exemplary partial retransmission according to an embodiment of the subject matter described herein, in which a CB is retransmitted in subsequent symbols following the DCI. In this embodiment, the receiver is already configured (by higher layers, or by specification) to always assume that CBs in retransmissions are located in subsequent symbols directly following the DCI, and in strict incrementing order. The DCI of the retransmission then contains an indication of which CB is present in the retransmission, and which RV is used.

In the embodiment illustrated in FIG. 3, the receiver receives a first transmission 16 comprising a DCI followed by three code blocks, CB1, CB2, and CB3, represented in FIG. 3 as pattern-filled boxes. The receiver indicates to the server, e.g., with a multi-bit HARQ feedback, that code blocks 1 and 3 were correctly decoded, but code block 2 was not correctly decoded.

The receiver next receives a retransmission 18. In one embodiment, the DCI for the retransmission 18 may contain the bitmap 010, indicating that only code block 2 is present, and also RV=1, indicating that the second RV of all retransmitted code blocks is used (first is RV=0). Thus, the receiver can use incremental redundancy to be able to decode CB2.

If, during the retransmission TTI, a Ultra-Reliable Low Latency Communication (URLLC) packet (or other latency-critical packet) is provided to the transmitter for transmission, there are opportunities to transmit the URLLC packet in the retransmission TTI without the need of puncturing another transmission, since the retransmission TTI contains unused resources, which are represented in FIG. 3 as white (unfilled) boxes. To make the retransmission consist of sequential symbols is also particularly useful in a case of high Doppler-spread, especially if the control region additionally consists of a Demodulation Reference Signal (DMRS) in symbol 2.

Should the first transmission of CB2 have been punctured by a URLLC transmission, leading to the faulty decoding of said code block, the transmitter should preferably choose RV=0 in the retransmission. As the transmitter has performed the puncturing, it knows when to make this decision.

Embodiment: In-Order Spread Out Allocation

FIG. 4 illustrates an exemplary partial retransmission according to an embodiment of the subject matter described herein, in which a code block being retransmitted is distributed in such a way as to provide space available for use to transmit latency critical data. FIG. 4 compares a retransmission 20, in which the code block(s) being retransmitted are located sequentially at the front of the retransmission 20, to a retransmission 22, in which the code block(s) being retransmitted are distributed throughout the retransmission 22.

In one embodiment, the DCI indicates only which code blocks are present in the retransmission, together with an RV value (which may or may not be individual per code block). In this embodiment, however, the receiver is pre-configured with a mapping that maps the set of code blocks being retransmitted to the locations within the retransmission where the retransmitted code block will appear. An example of such a map is shown in Table 1:

TABLE 1

| Example mapping from retransmission set to symbol location | | | | | | | | |
|---|---|---|---|---|---|---|---|---|
| Retransmit? (0 = no, 1 = yes) | | | Code Block | | | | | |
| CB1 | CB2 | CB3 | Symbol 2 | Symbol 3 | Symbol 4 | Symbol 5 | Symbol 6 | Symbol 7 |
| 0 | 0 | 1 |  | 3a |  |  | 3b |  |
| 0 | 1 | 0 |  | 2a |  |  | 2b |  |
| 0 | 1 | 1 | 2a |  | 2b | 3a |  | 3b |
| 1 | 0 | 0 |  | 1a |  | 1b |  |  |
| 1 | 0 | 1 | 1a |  | 1b | 3a |  | 3b |
| 1 | 1 | 0 | 1a |  | 1b | 2a |  | 2b |
| 1 | 1 | 1 | 1a | 1b | 2a | 2b | 3a | 3b |

In the embodiment illustrated by Table 1, retransmitted code blocks are divided into a first part (a) and a second part (b), which in this example corresponds to the first and second half of the code block. Empty cells in the table indicate symbol locations within the retransmission that are not used for retransmitted code blocks (and thus may be used for other purposes, such as for latency-critical transmissions).

This example mapping would maximize the number of separate groups of empty symbols for each retransmission set, which provides the best possibility of being able to transmit latency critical packets without puncturing, since transmission opportunities occur frequently within the TTI. In the embodiment illustrated in FIG. 4, for example, a first transmission (not shown) was received by the receiver, which indicated to the sender that the first code block (CB1), was not decoded successfully.

In one embodiment, the sender will retransmit failed code blocks in the same location as they originally appeared, e.g., CB1 occupies the first two symbols after the DCI of the retransmission 20. If a latency-critical packet (e.g., an URLLC packet) arrives at the transmitter just as the transmitter is sending the DCI of the retransmission 20, the soonest that the URLLC packet can also be transmitted (without puncturing another transmission) isn't until symbol 4. It is noted that the same problem occurs for the retransmission 18 in FIG. 3—namely, that the first opportunity to send an URLLC packet does not appear until symbol 4.

In contrast, the retransmission 22 uses a distributed retransmission format according to the Table 1. According to table 1, if only CB1 is to be retransmitted, the retransmitted code block is split into two parts, with the first part (CB1a) being transmitted during symbol 3 and the second part (CB1b) being transmitted in symbol 6. This is shown graphically as the retransmission 22 in FIG. 4. As a result of using this distributed retransmission format, the first opportunity to inject a latency-critical packet without puncturing another transmission occurs at symbol 2 (rather than at symbol 4 in the sequential retransmission format of the retransmission 18 and in the "same location as original" retransmission format of retransmission 20).

It will be understood that if a latency-critical transmission arrives at the transmitter while no code blocks are being retransmitted, then the TTI being transmitted at that time probably has no free resources, in which case the latency-sensitive transmission will need to wait until the next TTI (or else the transmitter will need to puncture one of the transmissions currently in progress).

The receiver may be configured with several mappings such as the one above. The DCI may then indicate which mapping is to be used, or the receiver might be configured with a "current" mapping by higher layers, that might change based on indication from the transmitter.

Embodiment: Retransmission Specific Mapping

In one embodiment, the transmitter may explicitly indicate the mapping that is to be used for the retransmission in the DCI. In one embodiment, this indication may be a set of bits indicating for each symbol following the DCI if that symbol is used by the retransmission.

Embodiment: Frequency Location

In one embodiment, the partitioned code blocks might not always only be separated by time (i.e., contained in separate symbols), but might overlap in time, being separated also by frequency. In these embodiments, the mapping would also include information about frequency locations of code blocks or code block parts. Such a mapping may be for instance mapping to Resource Elements (REs) rather than symbols.

Embodiment: Multiple User Massive Input Massive Output (MU-MIMO)

In a system where the transmitter is capable of performing MU-MIMO transmissions, the transmitter may transmit two TBs intended for different receivers simultaneously on the same frequency resources, but separated spatially. In a case where CBs are separated in time, the HARQ feedback indicates which CBs were decoded correctly and at least half of the CBs transmitted to the users were decoded correctly, the transmitter is able to map the retransmission of CBs to the users to be separated in time.

For example: Assuming each TB consists of 4 CBs, the first transmission to receivers 1 and 2 would be (omitting DCI for clarity):
  RX1: [CB1, CB2, CB3, CB4],
  RX2: [CB1, CB2, CB3, CB4]
If the HARQ feedbacks indicates the following decoding results,
  RX1: [0, 1, 0, 1],
  RX2: [0, 0, 1, 1],
the transmitter may choose mappings such that the corresponding retransmissions are:
  RX1: [CB1 CB3, NULL, NULL],
  RX2: [NULL, NULL, CB1, CB2],
where NULL means no transmission. In this particular example, the transmitter does not need to use MU-MIMO for retransmission of the code blocks, because there is no interference on the code blocks between the receivers. In another example there may be interference between retransmitted code blocks, in which case the transmitter would use MU-MIMO for the retransmission.

Figure 5:
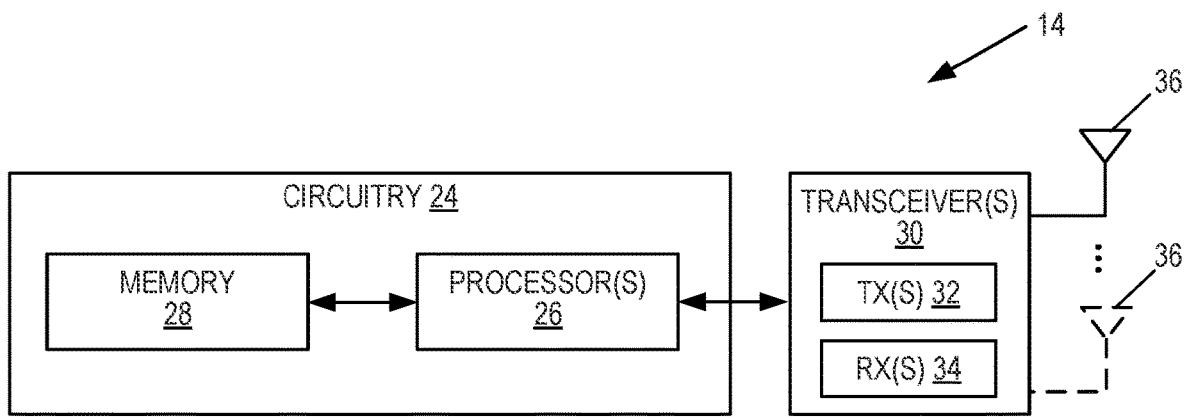
FIG. 5 is a schematic block diagram of an exemplary wireless device according to an embodiment of the present disclosure.

FIG. 5 is a schematic block diagram of the wireless device 14 (e.g., a UE) according to some embodiments of the present disclosure. As illustrated, the wireless device 14 includes circuitry 24 comprising one or more processors 26 (e.g., Central Processing Units (CPUs), Application Specific Integrated Circuits (ASICs), Field Programmable Gate Arrays (FPGAs), Digital Signal Processors (DSPs), and/or the like) and memory 28. The wireless device 14 also includes one or more transceivers 30 each including one or more transmitters 32 and one or more receivers 34 coupled to one or more antennas 36. In some embodiments, the functionality of the wireless device 14 described above may be implemented in hardware (e.g., via hardware within the circuitry 24 and/or within the processor(s) 26) or be implemented in a combination of hardware and software (e.g., fully or partially implemented in software that is, e.g., stored in the memory 28 and executed by the processor(s) 26).

In some embodiments, a computer program including instructions which, when executed by the at least one processor 26, causes the at least one processor 26 to carry out at least some of the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 6:
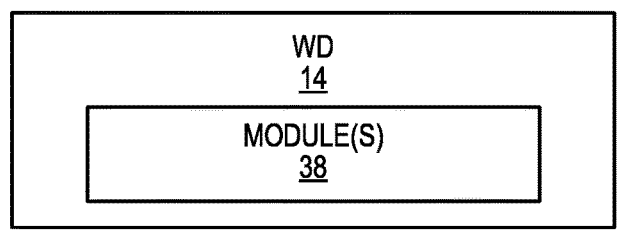
FIG. 6 is a schematic block diagram of an exemplary wireless device according to another embodiment of the present disclosure.

FIG. 6 is a schematic block diagram of the wireless device 14 (e.g., a UE) according to some other embodiments of the present disclosure. The wireless device 14 includes one or more modules 38, each of which is implemented in software. The module(s) 38 provide the functionality of the wireless device 14 described herein. For example, the modules(s) 38 may include a receiving module operable to perform step 100 of FIG. 2, a mapping module to perform steps 102 and 104 of FIG. 2, and a decoding module to perform step 106 of FIG. 2.

Figure 7:
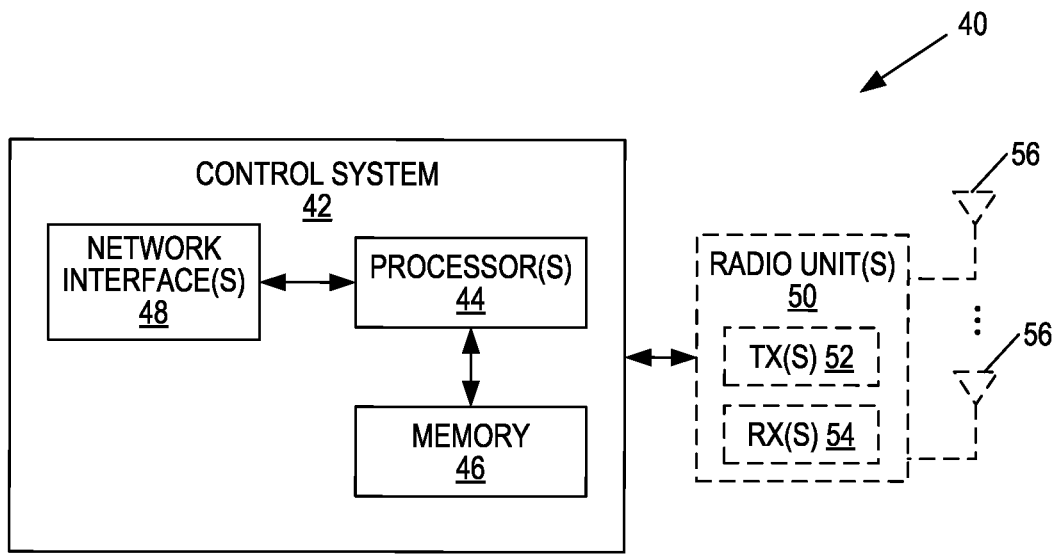
FIG. 7 is a schematic block diagram of an exemplary network node according to an embodiment of the present disclosure.

FIG. 7 is a schematic block diagram of a network node 40 according to some embodiments of the present disclosure. As illustrated, the network node 40 includes a control system 42 that includes circuitry comprising one or more processors 44 (e.g., CPUs, ASICs, DSPs, FPGAs, and/or the like) and memory 46. The control system 42 also includes a network interface 48. In embodiments in which the network node 40 is a radio access node, the network node 40 also includes one or more radio units 50 that each include one or more transmitters 52 and one or more receivers 54 coupled to one or more antennas 56. In some embodiments, the functionality of the network node 40 (e.g., the functionality of the radio access node 12) described above may be fully or partially implemented in software that is, e.g., stored in the memory 46 and executed by the processor(s) 44.

Figure 8:
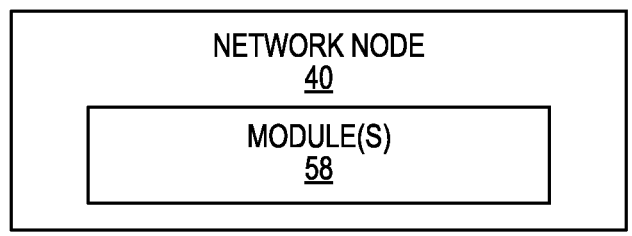
FIG. 8 is a schematic block diagram of an exemplary network node according to another embodiment of the present disclosure.

FIG. 8 is a schematic block diagram of the network node 40 (e.g., the radio access node 12) according to some other embodiments of the present disclosure. The network node 40 includes one or more modules 58, each of which is implemented in software. The module(s) 58 provide the functionality of the network node 40 described herein. The module (s) 58 may comprise, for example, one or more modules operable to provide the functionality of the network node 40 described herein.

Figure 9:
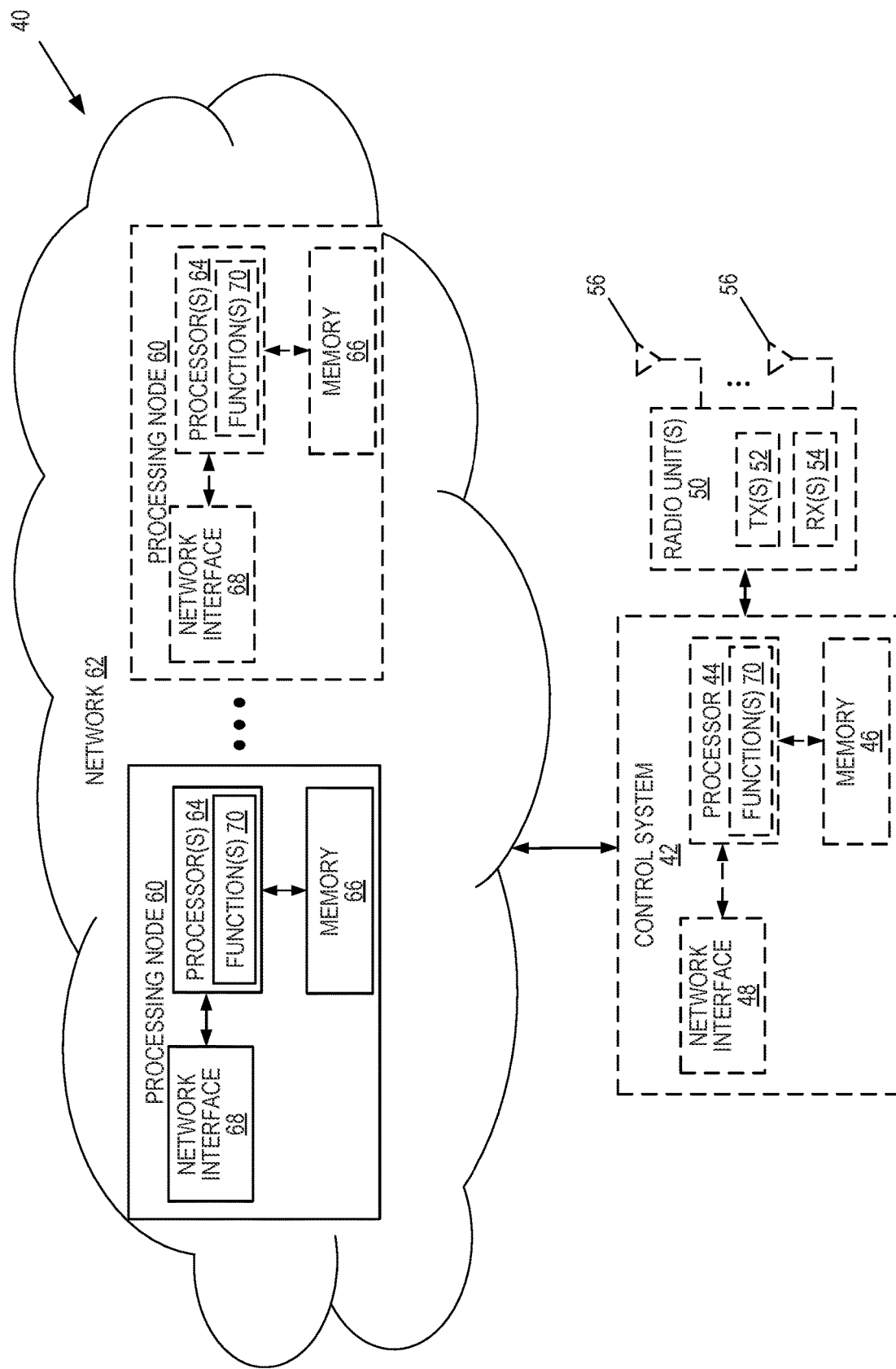
FIG. 9 is a schematic block diagram of an exemplary virtualized embodiment of a network node according to an embodiment of the present disclosure.

FIG. 9 is a schematic block diagram that illustrates a virtualized embodiment of the network node 40 (e.g., the radio access node 12) according to some embodiments of the present disclosure. As used herein, a "virtualized" network node is the network node 40 in which a portion of the functionality of the network node 40 is implemented as a virtual component (e.g., via a virtual machine(s) executing on a physical processing node(s) in a network(s)). As illustrated, the network node 40 optionally includes the control system 42, as described with respect to FIG. 7. In addition, if the network node 40 is the radio access node 12, the network node 40 also includes the one or more radio units 50, as described with respect to FIG. 7. The control system 42 (if present) is connected to one or more processing nodes 60 coupled to or included as part of a network(s) 62 via the network interface 48. Alternatively, if the control system 42 is not present, the one or more radio units 50 (if present) are connected to the one or more processing nodes 60 via a network interface(s). Alternatively, all of the functionality of the network node 40 described herein may be implemented in the processing nodes 60 (i.e., the network node 40 does not include the control system 42 or the radio unit(s) 50). Each processing node 60 includes one or more processors 64 (e.g., CPUs, ASICs, DSPs, FPGAs, and/or the like), memory 66, and a network interface 68.

In this example, functions 70 of the network node 40 described herein are implemented at the one or more processing nodes 60 or distributed across the control system 42 (if present) and the one or more processing nodes 60 in any desired manner. In some particular embodiments, some or all of the functions 70 of the network node 40 described herein are implemented as virtual components executed by one or more virtual machines implemented in a virtual environment(s) hosted by the processing node(s) 60. As will be appreciated by one of ordinary skill in the art, additional signaling or communication between the processing node(s) 60 and the control system 42 (if present) or alternatively the radio unit(s) 50 (if present) is used in order to carry out at least some of the desired functions. Notably, in some embodiments, the control system 42 may not be included, in which case the radio unit(s) 50 (if present) communicates directly with the processing node(s) 60 via appropriate network interface(s).

In some particular embodiments, higher layer functionality (e.g., layer 3 and up and possibly some of layer 2 of the protocol stack) of the network node 40 may be implemented at the processing node(s) 60 as virtual components (i.e., implemented "in the cloud") whereas lower layer functionality (e.g., layer 1 and possibly some of layer 2 of the protocol stack) may be implemented in the radio unit(s) 50 and possibly the control system 42.

In some embodiments, a computer program including instructions which, when executed by the at least one processor 44, 64, causes the at least one processor 44, 64 to carry out the functionality of the network node 40 or a processing node 60 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 46, 66).

In one embodiment, a receiver that has indicated unsuccessful reception of a portion or portions of a transmission receives a retransmission of the unsuccessfully received portion or portions of the first transmission. The receiver can then receive the retransmission only in the indicated locations, and can attempt to decode the data packet together with soft information (if any) from the first transmission.

In one embodiment, the receiver indicates unsuccessful reception of a portion or portions of a transmission via the HARQ feedback mechanism. In one embodiment, the HARQ feedback includes multiple bits per transport block. In one embodiment, these bits are used to signal a HARQ ACK or NACK per transport block or per code block (e.g., if a transport block contains multiple code blocks).

In one embodiment, the retransmission does not include information that identifies the portions being retransmitted. In another embodiment, the retransmission includes information that identifies the portions being retransmitted. In these embodiments, the receiver may use the information that identifies the portions being transmitted to verify that the retransmission includes the correct portions that the receiver indicated as being unsuccessfully received during the original transmission.

In one embodiment, the retransmission does not include an indicator that identifies the locations within the retransmission that contain the portions that are being retransmitted. In one embodiment, the receiver may presume that a retransmitted portion occupies the same location in the retransmission as the unsuccessfully received portion occupied in the original transmission. In another embodiment, the receiver may presume that the retransmitted portion or portions occupy the first-arriving locations within the retransmission.

In one embodiment the retransmission includes an indicator that identifies the locations, within the retransmission, that contain the portions being retransmitted. In one embodiment, the retransmission includes information from which the wireless device can determine the content and/or location of the portions being retransmitted. In one embodiment, the indicator is contained within DCI provided to the wireless device.

In one embodiment, the retransmission includes mapping information which the receiver uses to determine the content and/or location of the portions being retransmitted. In one embodiment, the transmitter may explicitly indicate the mapping that is to be used for the retransmission in the DCI. In one embodiment, this indication may be a set of bits indicating for each symbol following the DCI if that symbol is used by the retransmission. In one embodiment, the mapping information comprises an index into a lookup table that provides information indicating the content and location, within the retransmission, of the portions being retransmitted. In one embodiment, the mapping information identifies one lookup table out of a set of lookup tables that provide information indicating the content and location, within the retransmission, of the portions being retransmitted. In one embodiment, the lookup table or lookup tables are conveyed to the receiver via network signaling.

In one embodiment, the partitioned code blocks may be separated by frequency rather than by time, e.g., the code blocks occupy the same time but different frequencies. In one embodiment the partitioned code blocks may be separated by time and by frequency. In these embodiments, the mapping would include information about frequency locations of code blocks or code block parts. Such a mapping may be for instance mapping to REs rather than symbols.

In one embodiment, the retransmitted portions may be distributed within the retransmission or placed together at the end of the retransmission, e.g., so that URLLC or other high-priority transmissions may occupy the first portions of the retransmission and thus meet strict latency requirements. In one embodiment, the retransmitted portions may be placed together at the beginning of the retransmission, e.g., close to the Demodulation Reference Signals (DMRS), which reduces the likelihood that the retransmission may fail, especially in conditions of high Doppler spread.

Figure 10:
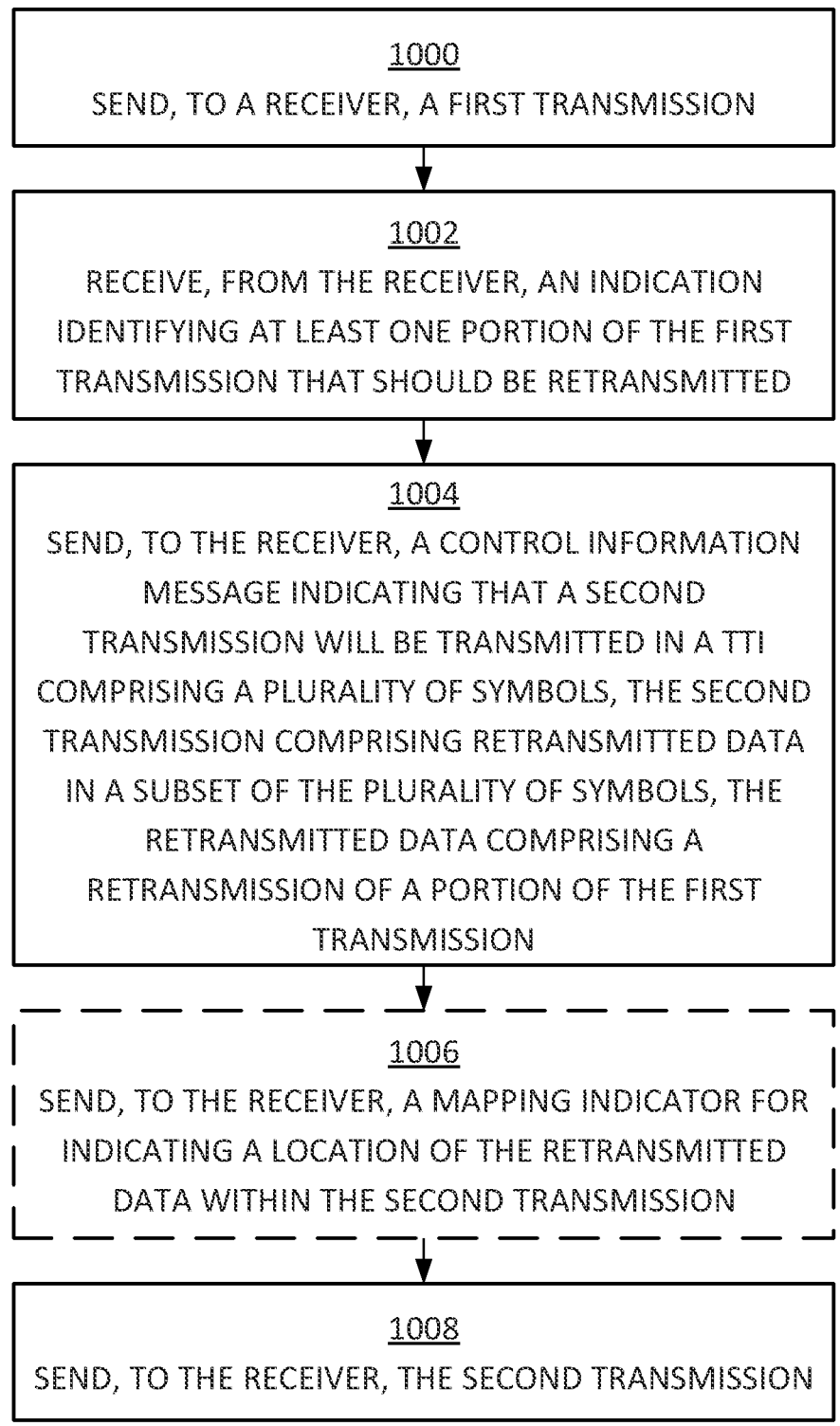
FIG. 10 is a flow chart illustrating an exemplary process for partial retransmission according to another embodiment of the subject matter described herein.

FIG. 10 is a flow chart illustrating an exemplary process for partial retransmission according to another embodiment of the subject matter described herein. In one embodiment, the process illustrated in FIG. 10 may be performed by a network node (e.g., the radio access node 12), referred to herein as the sender, in communication with a receiver (e.g., the wireless device 14).

At step 1000, the sender sends, to a receiver, a first transmission.

At step 1002, the sender receives, from the receiver, an indication identifying at least one portion of the first transmission that should be retransmitted. In one embodiment, the receiver responds to the first transmission with a multi-bit HARQ, indicating, for example, that some of the code blocks contained within the first transmission could not be decoded correctly.

At step 1004, the sender sends, to the receiver, a control information message indicating that a second transmission will be transmitted in a TTI comprising a plurality of symbols, the second transmission comprising retransmitted data in a subset of the plurality of symbols of the TTI, the retransmitted data comprising a retransmission of a portion of the first transmission. In one embodiment, the control information message may be a DCI message.

At step 1006, the sender sends, to the receiver, a mapping indicator for indicating a location of the retransmitted data within the second transmission. As indicated by the dotted outline, step 1006 is optional, e.g., the mapping indicator may have been previously provided to the receiver, or the receiver may have previously been provisioned with the mapping indicator, for example. Moreover, where the mapping indicator is sent to the receiver, the mapping indicator may be sent prior to step 1004, may be sent as part of the control information message in step 1004, may be sent after step 1004 but before step 1008, as illustrated in FIG. 10, or may be sent as part of the second transmission in step 1008.

At step 1008, the sender sends, to the receiver, the second transmission. The receiver will then use the mapping indicator to determine the location(s) of the retransmitted data within the second transmission.

Example Embodiments

Methods and systems for partial retransmission are provided herein. While not being limited thereto, some example embodiments of the present disclosure are provided below. It is noted that, for the embodiments below, the "control information indicating a second transmission to be received" is considered to be part of the retransmission (e.g., the DCI containing the assignment is also part of the retransmission), but these embodiments may also be worded in such a manner as to consider the control information indicating a second transmission to be received as separate from the retransmission (e.g., the "retransmission assignment" is separate from the retransmission proper), without departing from the scope of the subject matter disclosed. That is, the difference between the two approaches is a difference of semantics rather than of implementation.

1. A method for receiving, at a receiver, a partial retransmission from a sender, the method comprising: receiving (100) a control information message indicating a second transmission to be received, the second transmission being a retransmission of a portion of a first transmission; determining (104), based on the control information message, the portion or portions of the first transmission contained within the second transmission; and decoding (106) the determined portions of the second transmission.

2. The method of embodiment 1 further comprising performing soft combination of data received during the first transmission and data received during the second transmission.

3. The method of embodiments 1 or 2 wherein the receiver comprises a wireless device or user equipment.

4. The method of any of embodiments 1 to 3 wherein the transmission comprises a transport block and the portion of the transmission comprises a code block.

5. The method of any of embodiments 1 to 4 wherein the receiver indicates unsuccessful reception of a portion or portions of a transmission via the HARQ feedback mechanism.

6. The method of embodiment 5 wherein the HARQ feedback includes multiple bits per transport block.

7. The method of embodiment 6 wherein the multiple bits are used to signal a HARQ ACK or NACK per transport block or per code block.

8. The method of any of embodiments 1 to 7 wherein the retransmission does not include information that identifies the portions being retransmitted.

9. The method of any of embodiments 1 to 8 wherein the retransmission includes information that identifies the portions being retransmitted.

10. The method of embodiment 9 wherein the receiver uses the information that identifies the portions being transmitted to verify that the retransmission includes the correct portions that the receiver indicated as being unsuccessfully received during the first transmission.

11. The method of any of embodiments 1 to 10 wherein the retransmission does not include an indicator that identifies the locations within the retransmission that contain the portions that are being retransmitted.

12. The method of embodiment 11 wherein the receiver presumes that a retransmitted portion occupies the same location in the retransmission as the unsuccessfully received portion occupied in the original transmission.

13. The method of embodiment 11 wherein the receiver presumes that the retransmitted portion or portions occupy the earliest available location or locations within the retransmission.

14. The method of any of embodiments 1 to 10 wherein the retransmission includes an indicator that identifies a location or locations, within the retransmission, that contain the portion or portions being retransmitted.

15. The method of embodiment 14 wherein the indicator that identifies the location or locations within the retransmission that contain the portion or portions being transmitted identify locations in time, locations in frequency, or locations in time and frequency.

16. The method of any of embodiments 1 to 15 wherein the indicator is contained within DCI provided to the receiver.

17. The method of any of embodiments 1 to 16 wherein the retransmission includes mapping information which the receiver uses to determine (104) the content and/or location of the portions being retransmitted.

18. The method of embodiment 17 wherein the mapping information directly identifies the content and/or location of the portions being transmitted.

19. The method of embodiment 17 and 18 wherein the mapping information is contained within DCI provided to the receiver.

20. The method of any of embodiments 17 to 19 wherein the mapping information indirectly identifies the content and/or location of the portions being transmitted.

21. The method of any of embodiments 17 to 20 wherein the mapping information comprises a bitmap wherein each bit corresponds to a portion of the first transmission and the bit value indicates whether or not the corresponding portion is being retransmitted in the second transmission.

22. The method of any of embodiments 17 to 20 wherein the mapping information comprises an index into a lookup table that provides information indicating the content and location, within the retransmission, of the portions being retransmitted.

23. The method of embodiment 22 wherein providing information indicating the location, within the retransmission, of the portions being retransmitted comprises identifying locations in time, locations in frequency, or locations in time and frequency.

24. The method of embodiment 22 or 23 wherein the mapping information identifies one lookup table out of a set of lookup tables that provide information indicating the content and location, within the retransmission, of the portions being retransmitted.

25. The method of embodiment 24 wherein the lookup table or lookup tables are conveyed to the receiver via network signaling.

26. The method of any of embodiments 1 to 25 wherein the retransmitted portions are distributed within the retransmission.

27. The method of any of embodiments 1 to 25 wherein the retransmitted portions are placed together at the beginning of the retransmission.

28. A wireless device (14) for receiving partial retransmission from a sender, the wireless device (14) adapted to operate according to the method of any one of embodiments 1 to 27.

29. A computer program comprising instructions which, when executed on at least one processor, cause the at least one processor to carry out the method according to any of embodiments 1 to 27.

30. A carrier containing the computer program of embodiment 29, wherein the carrier is one of an electronic signal, an optical signal, a radio signal, or a computer readable storage medium.

31. A wireless device (14) for receiving partial retransmission from a sender, the wireless device (14) comprising: at least one transceiver (30); and processing circuitry (24) adapted to cause the wireless device (14) to operate according to the method of any one of embodiments 1 to 27.

32. A wireless device (14) for receiving partial transmission from a sender, the wireless device (14) comprising: at least one module (38) adapted to operate according to the method of any one of embodiments 1 to 27.

33. A method of performing a partial retransmission by a network node (40), the method comprising: sending, to a receiver, a first transmission; receiving, from the receiver, an indication identifying at least one portion of the first transmission that should be retransmitted; and sending, to the receiver, a second transmission, the second transmission comprising a retransmission of the identified at least one portion of the first transmission and containing a control information message that identifies the portions of the first transmission that are being retransmitted via the second transmission.

34. The method of embodiment 33 wherein the network node (40) comprises a radio access node (12).

35. A network node (40) for performing a partial retransmission, the network node (40) adapted to operate according to the method of embodiment 33 or 34.

36. A computer program carrying instructions which, when executed on at least one processor (64), cause the at least one processor (64) to carry out the method of embodiment 33 or 34.

37. A carrier containing the computer program of embodiment 35, wherein the carrier is one of an electronic signal, an optical signal, a radio signal, or a computer readable storage medium.

The following acronyms are used throughout this disclosure.

3GPP Third Generation Partnership Project
5G Fifth Generation
ACK Acknowledgement
ASIC Application Specific Integrated Circuit
BSC Base Station Controller
CB Code Block
CN Core Network
CPU Central Processing Unit
CRC Cyclic Redundancy Check
DCI Downlink Control Information
DMRS Demodulation Reference Signal
DSP Digital Signal Processor
eNB Enhanced or Evolved Node B
FDD Frequency Division Duplex
FPGA Field Programmable Gate Array
gNB New Radio Base Station
HARQ Hybrid Automatic Repeat Request
LAA License Assisted Access
LTE Long Term Evolution
MAC Media Access Controller
MBB Mobile Broadband
MHz Megahertz
MIMO Massive Input Massive Output
MME Mobility Management Entity
MU-MIMO Multiple User Massive Input Massive Output
MTC Machine Type Communication
NACK Negative Acknowledgement
NR New Radio
P-GW Packet Gateway
RE Resource Element
RNC Radio Network Controller
RV Redundancy Version
SCEF Service Capability Exposure Function
SGSN Serving General Packet Radio Service Support Node
TB Transport Block
TTI Transmission Time Interval
UE User Equipment
URLLC Ultra-Reliable Low Latency Communication Those skilled in the art will recognize improvements and modifications to the embodiments of the present disclosure. All such improvements and modifications are considered within the scope of the concepts disclosed herein.

What is claimed is:

1. A method for receiving, at a receiver, a partial retransmission from a sender, the method comprising:
    receiving a control information message indicating a transmission to be received in a Transmission Time Interval, TTI, comprising a plurality of symbols, the transmission comprising retransmitted data in a subset of the plurality of symbols of the TTI, the retransmitted data comprising a subset of code blocks of a previously transmitted transport block;
    receiving the transmission comprising the retransmitted data;
    determining symbol locations within the TTI of the transmission occupied by the subset of code blocks, based on a mapping of the subset of code blocks to symbol locations; and
    decoding the retransmitted data at the determined symbol locations within the transmission.

2. The method of claim 1 wherein the control information message comprises a Downlink Control Information, DCI, message.

3. The method of claim 1 wherein the control information message identifies what portion of the subset of code blocks of the previously transmitted transport block is being retransmitted.

4. The method of claim 1 wherein a mapping indicator is included in the received control information message.

5. The method of claim 1 wherein a mapping indicator is received separately from the control information message.

6. The method of claim 1 wherein a mapping indicator indicates that the retransmitted data will occupy a same location or locations in the transmission as originally transmitted data occupied in the subset of code blocks of the previously transmitted transport block.

7. The method of claim 1 wherein a mapping indicator indicates that the retransmitted data will occupy contiguous locations within the transmission.

8. The method of claim 1 wherein a mapping indicator indicates that the retransmitted data will be distributed throughout the transmission.

9. The method of claim 1 wherein a mapping indicator identifies what portion of the subset of code blocks of the previously transmitted transport block is being retransmitted.

10. The method of claim 1 wherein a mapping indicator identifies one mapping from among a plurality of mappings, each mapping identifying at least one of:
    a location of the retransmitted data within the transmission; and
    what portion of the subset of code blocks of the previously transmitted transport block is being retransmitted.

11. The method of claim 1 wherein the control information message or a mapping indicator includes a combination instruction that indicates whether the retransmitted data will replace originally transmitted data or will be soft combined with the originally transmitted data.

12. The method of claim 11 wherein the combination instruction comprises a redundancy version.

13. The method of claim 1 wherein the receiver comprises a wireless device or user equipment.

14. The method of claim 1 wherein the receiver indicates unsuccessful reception of a portion or portions of the transmission via transmitting a Hybrid Automatic Repeat Request, HARQ, feedback.

15. The method of claim 14 wherein the HARQ feedback comprises multiple bits per transport block.

16. The method of claim 15 wherein the multiple bits are used to signal a HARQ Acknowledgement, ACK, or Negative ACK, NACK, per transport block or per code block.

17. A wireless device for receiving partial retransmission from a sender, the wireless device comprising:
    at least one transceiver; and
    processing circuitry adapted to cause the wireless device to:
        receive a control information message indicating a transmission to be received in a Transmission Time Interval, TTI, comprising a plurality of symbols, the transmission comprising retransmitted data in a subset of the plurality of symbols of the TTI, the retransmitted data comprising a subset of code blocks of a previously transmitted transport block;
        receive the transmission comprising the retransmitted data;
        determine symbol locations within the TTI of the transmission occupied by the subset of code blocks, based on a mapping of the subset of code blocks to symbol locations; and
        decode the retransmitted data at the determined symbol locations within the transmission.

18. A method of performing a partial retransmission by a sender, the method comprising:
    sending, to a receiver, a first transmission of a transport block;
    receiving, from the receiver, an indication identifying a subset of code blocks of the transport block that should be retransmitted;
    sending, to the receiver, a control information message indicating that a second transmission will be transmitted in a Transmission Time Interval, TTI, comprising a plurality of symbols, the second transmission comprising retransmitted data in a subset of the plurality of symbols of the TTI, the retransmitted data comprising the subset of the code blocks of the transport block; and
    sending, to the receiver, the second transmission comprising the subset of code blocks at symbol locations within the TTI determined based on a mapping.

19. The method of claim 18, further comprising, prior to sending the second transmission: sending, to the receiver, a mapping indicator for indicating a location of the retransmitted data within the second transmission.

20. The method of claim 19 wherein the mapping indicator is sent as part of the control information message.

21. The method of claim 19 wherein the mapping indicator is sent separately from the control information message.

22. The method of claim 18 wherein a mapping indicator indicates that the retransmitted data will occupy a same location or locations in the second transmission as originally transmitted data occupied in the first transmission.

23. The method of claim 18 wherein a mapping indicator indicates that the retransmitted data will occupy contiguous locations within the second transmission.

24. The method of claim 18 wherein a mapping indicator indicates that the retransmitted data will be distributed throughout the second transmission.

25. The method of claim 18 wherein a mapping indicator identifies what portion of the first transmission is being retransmitted.

26. The method of claim 18 wherein a mapping indicator identifies one mapping from among a plurality of mappings, each mapping identifying at least one of:
    the location of the retransmitted data within the second transmission; and
    what portion of the first transmission is being retransmitted.

27. The method of claim 18 wherein the control information message or a mapping indicator includes a combination instruction that indicates whether the retransmitted data will replace originally transmitted data or will be soft combined with the originally transmitted data.

28. The method of claim 27 wherein the combination instruction comprises a redundancy version.

29. The method of claim 18 wherein the receiver comprises a wireless device or user equipment.

30. The method of claim 18 wherein the receiver indicates unsuccessful reception of a portion or portions of a transmission via transmitting a Hybrid Automatic Repeat Request, HARQ, feedback.

31. The method of claim 18 wherein the HARQ feedback comprises multiple bits per transport block.

32. The method of claim 31 wherein the multiple bits are used to signal a HARQ Acknowledgement, ACK, or Negative ACK, NACK, per transport block or per code block.

33. The method of claim 18 wherein the sender comprises a network node.

34. The method of claim 33 wherein the network node comprises a radio access node.

35. A network node for performing a partial retransmission, the network node comprising:
    at least one radio unit; and a control system adapted to cause the network node to:
   send, to a receiver, a first transmission of a transport block;
   receive, from the receiver, an indication identifying a subset of code blocks of the transport block that should be retransmitted;
   send, to the receiver, a control information message indicating that a second transmission will be transmitted in a Transmission Time Interval, TTI, comprising a plurality of symbols, the second transmission comprising retransmitted data in a subset of the plurality of symbols of the TTI, the retransmitted data comprising the subset of the code blocks of the transport block; and
   send, to the receiver, the second transmission comprising the subset of code blocks at symbol locations within the TTI determined based on a mapping.

* * * * *

UNITED STATES PATENT AND TRADEMARK OFFICE
CERTIFICATE OF CORRECTION

PATENT NO. : 11,838,130 B2
APPLICATION NO. : 17/693909
DATED : December 5, 2023
INVENTOR(S) : Olsson et al.

It is certified that error appears in the above-identified patent and that said Letters Patent is hereby corrected as shown below:

In the Specification

In Column 1, Line 26, delete "Controller" and insert -- Control --, therefor.

In Column 11, Lines 22-23, delete "Multiple User Massive Input Massive Output (MU-MIMO)" and insert -- Multi-User Multiple-Input Multiple-Output (MU-MIMO) --, therefor.

In Column 18, Line 17, delete "Controller" and insert -- Control --, therefor.

In Column 18, Line 20, delete "Massive Input Massive Output" and insert -- Multiple-Input Multiple-Output --, therefor.

In Column 18, Line 22, delete "Multiple User Massive Input Massive Output" and insert -- Multi-User Multiple-Input Multiple-Output --, therefor.

Signed and Sealed this
Fourteenth Day of May, 2024

Katherine Kelly Vidal
*Director of the United States Patent and Trademark Office*